United States Patent [19]

Renalls et al.

[11] Patent Number: 4,546,036
[45] Date of Patent: Oct. 8, 1985

[54] MAGNETIC RECORDING MEDIUM HAVING OPAQUE POLYESTER FILM BASE

[75] Inventors: Brenda L. Renalls, St. Paul, Minn.; Douglas G. Pedrotty, Baldwin, Wis.; John F. Donlan, West St. Paul, Minn.

[73] Assignee: Minnesota Mining and Manufacturing Company, St. Paul, Minn.

[21] Appl. No.: 565,016

[22] Filed: Dec. 22, 1983

[51] Int. Cl.$^4$ .............................................. G11B 5/70
[52] U.S. Cl. .................................... 428/323; 428/408; 428/480; 428/694; 428/900; 428/141; 428/147; 524/496; 524/605; 528/308.2; 360/134; 360/135; 360/136
[58] Field of Search ............... 428/694, 695, 403, 407, 428/408, 900, 480, 323, 141, 147; 427/44, 130, 131; 528/308.2, 308.1, 502; 524/496, 605; 360/134–136

[56] References Cited

U.S. PATENT DOCUMENTS

| | | |
|---|---|---|
| 3,340,062 | 9/1967 | Hunter, Jr. et al. ................... 96/84 |
| 3,607,818 | 9/1971 | Trubisky ............................. 524/496 |
| 3,640,944 | 2/1972 | Seppala et al. ...................... 260/40 |
| 3,790,653 | 2/1974 | Barkey et al. ....................... 264/171 |
| 3,830,773 | 8/1974 | Barkey et al. ....................... 260/40 R |
| 3,905,938 | 9/1975 | Barkey ............................... 428/480 |
| 4,198,458 | 4/1980 | Mitsuishi ............................ 428/480 |
| 4,348,446 | 9/1982 | Mitsuishi ............................ 428/694 |
| 4,367,261 | 1/1983 | Miyoshi .............................. 428/336 |
| 4,414,270 | 11/1983 | Miyoshi .............................. 428/325 |
| 4,419,406 | 12/1983 | Isobe ................................ 428/900 |
| 4,461,797 | 7/1984 | Adachi ............................... 428/480 |

FOREIGN PATENT DOCUMENTS 83841 7/1981 Japan.
130232 8/1982 Japan.

*Primary Examiner*—Ellis P. Robinson
*Attorney, Agent, or Firm*—D. M. Sell; J. A. Smith; D. B. Little

[57] ABSTRACT

A magnetic recording medium has a biaxially-oriented polyester film base which includes carbon black beads having a median diameter from 50 to 500 nm and is substantially free from beads or agglomerates more than 5 micrometers in diameter. The beads provide opacity such as is often required of the flexible recording disk of a diskette. The film base may be either a single layer, throughout which the beads are uniformly dispersed, or it may be multi-layer, e.g., a central layer containing the carbon black beads and two surface layers which are free from the beads.

11 Claims, 5 Drawing Figures

200 μm

200 μm

200μm

MAGNETIC RECORDING MEDIUM HAVING OPAQUE POLYESTER FILM BASE

FIELD OF THE INVENTION

The invention concerns opaque polyester film base for magnetic recording media, the opacity being provided by carbon black particles dispersed in the polyester.

BACKGROUND ART

Many diskette recorders optically sense the index hole and hence require an opaque recording disk. Specifications for some of those recorders call for no more than 0.5% transmission at a wavelength of 940 nm. The magnetic recording layer of the recording disk of an ordinary diskette may have a thickness from 3 to 5 micrometers which inherently provides sufficient opacity to meet those specifications. However, the magnetic recording layer of typical high-density diskettes may be so thin, e.g. only 1.0 to 1.5 micrometers, as to lack sufficient opacity for optical sensing mechanisms to operate correctly.

To improve the opacity of the recording disk of a high-density diskette, one manufacturer applies a carbon black coating beneath the magnetic recording layer.

Another approach to this problem would be to incorporate a light-blocking agent such as carbon black into the film base of the recording disk. Japanese Patent Application 54-160528 filed Dec. 11, 1979 (Shiegeki et al.) reports that if the film base has a single layer, this results in surface unevenness which prevents the attainment of a suitably smooth recording layer, resulting in frequent dropouts and reduced magnetic output. The Japanese application answers this problem by a laminated film base, one layer of which contains a light-blocking agent while at least one surface layer contains no light-blocking agent. The application reports that three polyethylene terephthalate films, the center of which comprised 1% carbon black, were coextruded or laminated and then biaxially oriented and heat fixed to provide a film base for a diskette. Although the resultant 3-layer film base presumably had a smooth surface since it reportedly had good magnetic output and no dropouts, no data is given concerning either the degree of smoothness or how the magnetic output and dropouts were measured.

A sample 3-layer film base containing carbon black only in the central layer has been obtained from Toray Co., assignee of JA 54-160527. A transmission electron micrograph of the sample reveals exceedingly fine carbon black beads, the median size of which is about 30 nm. Although dispersed throughout the central layer, a significant proportion of the beads form clusters or aggregates of widely varying sizes which result in protrusions projecting from the surfaces, thus making the sample unsuitably rough for use as the film base of a high-density diskette.

JA 54-160527 suggests that the presence of carbon black in the magnetic recording layer would provide the desired opacity, but that the carbon black would displace some of the magnetizable particles and thus reduce the recording density. Not mentioned is the greater danger that the carbon might interfere with curing of the binder and consequently reduce the durability.

Japanese Patent Application 56-15301 filed Feb. 3, 1981 (Nishioka) also concerns the problem of enhancing the opacity of the recording disk of a diskette. Its answer is an aluminum vapor-deposited layer on each surface of the base film.

The magnetic recording tape of a VHS cassette should be opaque to differentiate from a transparent leader which is optically sensed to stop the drive at the end of the tape. To date, the magnetic recording layers of VHS tapes have sufficient thickness to provide the desired opacity. If future specifications should require substantially thinner magnetic recording layers, it might become necessary to modify the VHS tape to enhance its opacity.

Other Prior Art

U.S. Pat. Nos. 3,790,653 and 3,830,773 (both Barkey et al.) concern biaxially-oriented polyethylene terephthalate film base having good opacity for photographic uses. It obtains that opacity by dispersing carbon black of exceedingly fine particle size (preferably "furnace black") into ethylene glycol in the presence of a dispersing agent (specifically polyvinylpyrrolidone) and adding that dispersion to other polyester-forming reactant materials. The ultimate average particle size of the carbon black is preferably within the range from 8 to 80 nm. By "ultimate particle size" is meant the size of the individual carbon particles and not the size of the carbon black "agglomerates" or "beads" provided commercially. The Barkey patents break up the commercial carbon black by high-shear milling in ethylene glycol in the presence of polyvinylpyrrolidone. The Barkey patents say nothing about the surface smoothness of the film base, although the reported testing of specular optical density should have provided useful information. The patents contain insufficient information about that testing for one to ascertain what surface smoothness was attained.

Each of the Barkey patents at column 1 cites a number of closely related patents concerning methods of producing opaque polyethylene terephthalate films, fibers, and other shaped articles.

DISCLOSURE OF INVENTION

The invention concerns a magnetic recording medium which like that of JA 54-160527 comprises a biaxially-oriented single- or multi-layer polyester film base and at least one magnetic recording surface layer, there being finely divided carbon black uniformly dispersed throughout at least one layer of the film base to provide opacity. The novel medium differs in that the carbon black comprises from 0.1 to 3% by weight of the film base (preferably 0.5 to 1%) and is in the form of beads having a median diameter from 50 to 500 nm, is substantially free from beads or agglomerates exceeding 2 micrometers in diameter, and when viewed at 75× magnification, the surface of the film base is substantially free from distinct peaks such as would be present if the film base contained agglomerates or beads exceeding 5 or 10 micrometers in diameter. It is convenient to examine individual fields of 1.2×1.5 mm, and the film base of the invention is unlikely to include any such distinct peaks within a randomly selected field that size. Preferably the film base is substantially free from beads or agglomerates exceeding 1 or 2 micrometers in diameter.

As observed in U.S. Pat. No. 3,790,653, carbon black is marketed as agglomerates or beads, each containing a great number of individual particles. To be used in the present invention, commercial-size agglomerates or beads must be reduced to beads of the desired size, namely to a median diameter between 50 and 500 nm. This may be accomplished by milling the agglomerates in a minimum amount of ethylene glycol in the presence of a dispersing agent such as polyvinylpyrrolidone (PVP), and this dispersion may be added to the reaction mass of a polyester-forming process before or after ester interchange prior to polycondensation. While U.S. Pat. No. 3,790,653 only describes its mill by identifying the manufacturer, it has been found that furnace black in ethylene glycol and dispersing agent can be milled to provide carbon black beads of the aforementioned median diameter, either by three or more passes (preferably 6) through a sand mill or by ball milling for at least 24 hours (preferably 50). Channel black also can be reduced to the desired bead size by substantially the same degree of milling, but other carbon blacks may require more prolonged milling.

The most uniform dispersions of carbon black beads in polyester have been obtained by adding the milled carbon black, ethylene glycol, and dispersant to the polyester reaction mass immediately following the ester interchange step.

Although U.S. Pat. No. 3,790,653 employs at least one part by weight of PVP per 6 parts of carbon black, a lower ratio in the present invention provides better results. Preferably there are from 1 to 7 parts by weight of dispersant per 100 parts of carbon black. Below a 1% ratio, the carbon black may reagglomerate during formation of the film base. A ratio above about a 7% ratio would be economically wasteful and might be detrimental to quality.

When the polyester film base of the novel recording medium is a single layer, uniformly dispersed carbon black beads, nearly all of which are between 50 and 500 nm in diameter inherently provide a slight peak-to-valley surface roughness between about 100 and 200 nm. Changes in the amount of such carbon black beads from 0.1 to 3% do not observably change the surface roughness value. A roughness of that order is usually desired in any plastic film to permit it to be wound up into a roll without wrinkling. To achieve that degree of surface roughness, it is common in the manufacture of polyester films to incorporate so-called slip agents such as silicon dioxide or calcium carbonate, but there is no need for a conventional slip agent in the film base of the present invention since the carbon black beads provide the slight surface roughness needed for windability and to avoid blocking during storage in roll form.

Some magnetic recording media require film bases of even greater surface smoothness, and these may be made without any slip agent by knurling the edges of the film. Any film of such smoothness after being wound upon itself should be used within a day or two before entrapped air bleeds out from between adjacent convolutions. Such greater surface smoothness can be achieved in making media of the invention by using a technique like that of JA 54-160527 wherein a carbon-filled polyester film is coextruded with at least one unfilled polyester film. When using carbon black beads which are between 50 and 500 nm in diameter, the unfilled outer polyester films can provide peak-to-valley surface roughnesses substantially below 100 nm.

Transmissivity of the novel polyester film base at 940 nm is only about ¼% at a carbon black loading of 0.5% by weight of the base film, so that diskettes made with such a film base should meet all existing opacity specifications regardless of the thicknesses of their magnetic recording layers. More than 3% loading would be economically wasteful.

While best results have thus far been attained when using PVP as the dispersant, carbon black beads have been well dispersed in polyester using epoxidized polybutadiene or a sodium salt of a sulfonated naphthalene ("Tamol SN").

The novel polyester film base preferably comprises polyethylene terephthalate obtained from ethylene glycol and dimethyl terephthalate, and is readily available at moderate cost. As is known in the art, the ethylene glycol may be substituted in whole or in part by glycols having from 3 to 10 carbon atoms, and substitutes are also available for the terephthalate such as terephthalates having alkyl groups of 1 to 4 carbon atoms.

THE DRAWING

DETAILED DESCRIPTION

Figure 1:
FIG. 1 is a transmission electron micrograph of a microtome section of a single-layer polyester film base of the invention wherein carbon black beads comprise 0.5% by weight of the film base.

In the limited field of view of FIG. 1, with one exception all of the carbon black beads are nearly spherical and appear to range in diameter from about 0.1 to 0.3 micrometer. The exception appears to be a single agglomerate about 0.6 micrometer in diameter. FIG. 1 indicates that the beads and agglomerate are well dispersed.

Figure 2:
FIG. 2 is a transmission electron micrograph of a microtome section of the central layer of a 3-layer polyester film base of the invention wherein carbon black beads comprise 3% by weight of the central layer.

The carbon black beads shown in FIG. 2 also are nearly spherical, well dispersed, and appear to range in diameter from about 0.1 to 0.3 micrometer.

Although the transmission electron micrographs of FIGS. 1 and 2 cover exceedingly small areas and only one additional transmission electron micrograph has been made of film bases of the invention, it can be surmised that agglomerates exceeding 1 or 2 micrometers in diameter are rare in film bases of the invention.

Figure 5:
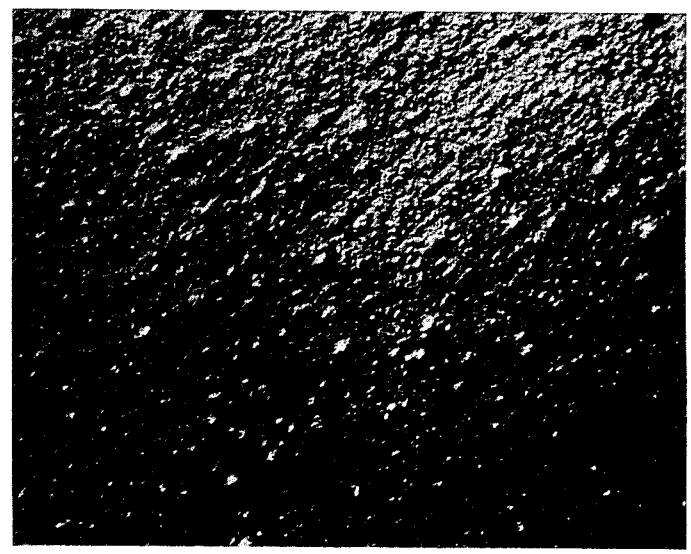

FIG. 5 shows the film base of the above-discussed 3-layer prior-art sample received from Toray Co. More than 15 peaks projecting from the background are attributed to carbon black agglomerates of at least 5 or 10 micrometers in diameter. A transmission electron micrograph of a microtome section of the Toray sample shows large numbers of carbon black agglomerates of that size. Even though chemical analysis indicates that the Toray sample contains silicon and calcium, thus suggesting the presence of a slip agent, any such slip agent is very finely divided and does not show in the transmission electron micrograph.

Figure 3:
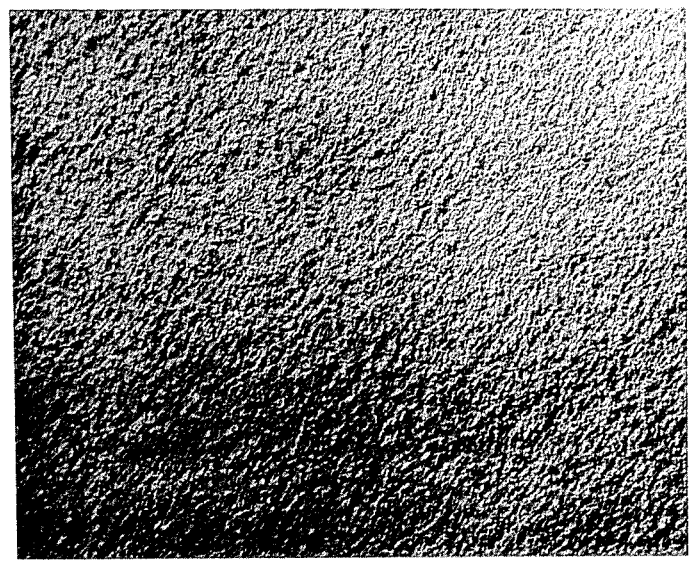
FIGS. 3–5 are photographs at 75× magnification of the surfaces of a single-layer film base of the invention (FIG. 3), a tri-layer film base of the invention (FIG. 4), and a film base of the prior art (FIG. 5). Each of these film bases has an aluminum vapor deposit for the purpose of highlighting any surface discontinuity.
Figure 4:
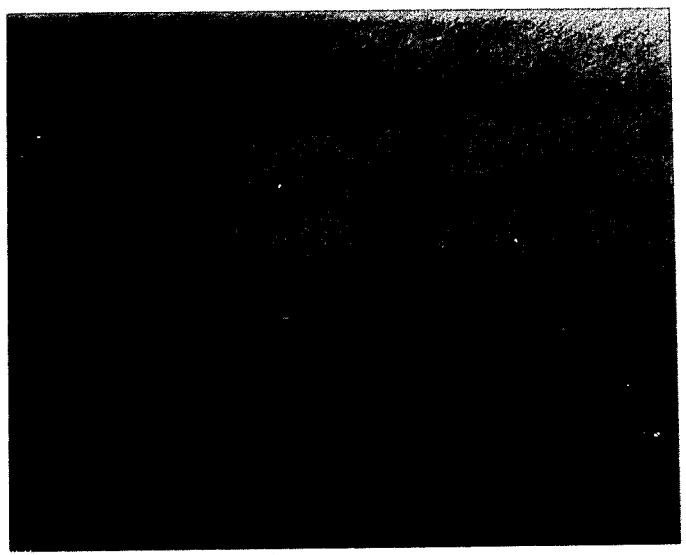

Neither of the photographs of FIGS. 3 or 4 shows any peak projecting from the background which can be attributed to a bead or agglomerate as large as 5, or even 2, micrometers. A peak produced by a bead or agglomerate of 1 or 2 micrometers might not be distinguishable from the background in FIG. 3. Since what might possibly be a few small peaks in FIG. 4 appear to approximate the background of FIG. 3, no estimate can be made as to the size of any agglomerate or bead which may have produced those small peaks.

Hereinafter all parts are given by weight unless otherwise noted.

Carbon Black Dispersion A

In a 50-gallon (200-liter) tank, 69.4 parts of ethylene glycol and 0.6 part PVP (polyvinylpyrrolidone) wetting agent were intensively mixed using a high-shear mixer while slowly adding 30 parts of furnace black (specifically Ashland "SL-90" which is said to have a 90 nm particle size.) After one hour at 2000 rpm, the mixture was pumped at 1.5 liters per minute through a sandmill ("3P Redhead") containing uniform 1.5 mm glass beads and maintained at a 1.8 setting. Six passes through the mill provided a uniform dispersion of carbon black beads. The finished dispersion was held with low speed agitation until ready for reactor addition.

Carbon Black Dispersion B

Into a 100-gallon (400-liter) stainless steel ball mill were charged 69.4 parts of ethylene glycol, 30 parts of "SL-90" carbon black, and 0.6 part PVP. The mill with round stainless steel balls (1.27 cm diameter) was rotated for 52 hours to obtain a uniform dispersion of carbon black beads. The dispersion was drained into a 50-gallon (200-liter) container and held with light agitation until ready for reactor addition.

Examination of a sample of the dispersion in a Leeds & Northrup "Microtrac" particle analyzer indicated that the carbon black had a median size of 0.49 micrometer and an average size of 0.57 micrometer. The particle analyzer measures the size of "beads" or "aggregates," not ultimate particle size.

Carbon Black Masterbatch A and Polyester Film Base A

Into a 100-gallon (400-liter) reactor equipped with a turbine agitator and a hot-oil jacket were charged 100 parts by weight of dimethyl terephthalate, 70 parts of ethylene glycol, 0.05 part of manganese acetate, and 0.035 part of antimony trioxide. While agitating at pressure of 138 kPa, the temperature was gradually raised to 249° C. while fractionating off 33 parts by weight of methanol. The pressure was slowly reduced to atmospheric level and the batch contents cooled to 205° C. The contents were transferred through a 20-micrometer sintered metal filter to a 100-gallon (400-liter) polymerization vessel equipped with an anchor agitator and a hot-oil jacket, and the temperature was adjusted to 198° C. Approximately 450 liters of dispersion were processed in four batches before it was necessary to change the filter.

To this dispersion was added 59 parts by weight of Carbon Black Dispersion A at 4.8 liters per minute through a 10-micrometer wound cotton filter to remove any residual aggolmerates. Agitation was maintained at 90 rpm during the addition. Following the addition, the temperature was increased to 260° C. at 0.6° C. per minute to strip excess ethylene glycol. At 260° C. the pressure was reduced to 1 mmHg or less over a 20 minute period. The temperature was gradually increased at 66 rpm agitation to 282° C., and polycondensation was continued with ethylene glycol removal until an intrinsic viscosity of 0.40 in trifluoroacetic acid was achieved, as measured by agitator torque. The reactor was then drained under nitrogen pressure into trays, cooled with air, and the resulting slabs were ground in an impact rotary grinder with a ¼-inch (0.64-cm) bottom screen. A small quantity of the resulting powder (Carbon Black Masterbatch A) was fused under pressure to a wafer 1.3 mm in thickness which was biaxially oriented about 3 times in each direction. Microscopic examination of the resulting single-layer Polyester Film Base A at 75× showed uniform, slightly rough surfaces which were substantially free from projecting peaks.

Carbon Black Masterbatch B

Carbon Black Masterbatch B was prepared in the same manner as was Carbon Black Masterbatch A except using Carbon Black Dispersion B instead of Carbon Black Dispersion A.

EXAMPLE 1

Into a first extruder were fed 100 parts of polyethylene terephthalate and 11 parts of a slip agent, namely $SiO_2$ particles having an average particle size of 40 nm. Into a second extruder were fed 100 parts of polyethylene terephthalate and 24 parts of a mixture of Carbon Black Masterbatches A and B (about 70 parts A per 30 parts B). While heated to 265° C., the contents of both extruders were passed through 20-micrometer sintered metal filters, and the extrudate from the first extruder was split into two streams. The three streams were simultaneously fed through a drop die to provide a single 3-layer polyester sheet, the central layer of which contained carbon black beads and the outer layers of which contained only the $SiO_2$ slip agent of a smaller size than is conventionally used. Each of the outer layers was about 0.40 mm in thickness and the inner layer was about 0.16 mm in thickness. The width of the 3-layer sheet was about 45 cm. After being quenched on a water-cooled casting roll, the sheet was biaxially oriented about 3.5 times in each direction and heat set at 247° C. to provide a high-strength film base about 0.075 mm in thickness. A face of this film base is shown in FIG. 4 of the drawing.

Onto both faces of this film base were coated a dispersion of acicular, cobalt-modified, gamma $Fe_2O_3$ particles in a polyurethane binder containing an isocyanate curing agent. The acicular particles had a median length of 0.2 micrometers and an aspect ratio of 4:1. The coatings were dried to thicknesses of about 1.4 micrometers to provide a magnetic recording medium.

EXAMPLE 2

Into both extruders used in Example 1 was fed a mixture of 100 parts of polyethylene terephthalate and 3.4 parts of a 70:30 mixture of Carbon Black Masterbatches A and B. Coextrusion as in Example 1 provided a single-layer polyester sheet which was biaxially oriented and heat set as in Example 1 to provide a polyester film base about 0.075 mm in thickness. A face of this film base is shown in FIG. 3.

Both faces of this film base were coated as in Example 1 to provide a magnetic recording medium.

Testing

Each of the magnetic recording media of Examples 1 and 2 was punched, burnished and assembled into a diskette jacket to provide Diskettes 1 and 2, respectively. Each was tested in comparison to two other diskettes which were made in the same way except with different film bases. A "Control" Diskette had a polyester film base filled only with 0.2% by weight of calcium carbonate slip agent having a median particle size of 0.5 micrometer. A "Toray" Diskette used as its film base the aforementioned 3-layer polyester sample received from Toray having carbon black in its central layer and apparently having slip agent in its outer layers.

The four diskettes were tested for missing pulse (MP) errors at 85%, extra pulse (EP) errors at 10%, and transmission at 940 nm, with the following results:

| Diskette | MP at 85% Errors | EP at 10% Errors | Transmission (%) |
|---|---|---|---|
| 1 | 8 ± 9 | 13 ± 1 | 0.02 |
| 2 | 8 ± 6.5 | 12 ± 12 | 0.04 |
| Control | 43 ± 46 | 11 ± 9 | >2 |
| Toray | 76 ± 23 | 30 ± 23 | 0.04 |

The relatively high number of missing pulse errors of the "Control" Diskette is attributable to the relatively large size of its calcium carbonate slip agent as compared to the carbon black beads in Diskette 2 and the beads plus $SiO_2$ slip agent in Diskette 1. The transmission data was obtained using an IXI Model LTT-1A diskette transmittance tester.

We claim:

1. Magnetic recording medium comprising a biaxially-oriented single- or multi-layer polyester film base and at least one magnetic recording surface layer there being finely divided carbon black uniformly dispersed throughout at least one layer of the film base to provide opacity, wherein the improvement comprises:

the carbon black comprises from 0.1 to 3% by weight of the film base and is in the form of beads having a median diameter from 50 to 500 nm, and when viewed at 75× magnification, the surface of the film base is substantially free from distinct peaks much as would be present if the film base contained beads or agglomerates exceeding 5 micrometers in diameter.

2. Magnetic recording medium as defined in claim 1, the film base of which is substantially free from beads or agglomerates exceeding 2 micrometers in diameter.

3. Magnetic recording medium as defined in claim 1 wherein the carbon black beads comprise from 0.5 to 1% by weight of the film base.

4. Magnetic recording medium as defined in claim 1 wherein the film base includes from 1 to 7 parts by weight of dispersant per 100 parts of carbon black.

5. Magnetic recording medium as defined in claim 4 wherein the dispersant is polyvinylpyrrolidone.

6. Magnetic recording medium as defined in claim 1 wherein the polyester film base is a single layer and the carbon black beads are uniformly distributed throughout that layer and provide a peak-to-valley surface roughness between 100 and 200 nm.

7. Magnetic recording medium as defined in claim 1 wherein the polyester base includes at least two layers, only one of which contains said carbon black beads.

8. Magnetic recording medium as defined in claim 1 wherein the exposed face of one of said layers which is free from carbon black has a peak-to-valley surface roughness of less than 100 nm.

9. Magnetic recording medium as defined in claim 1 wherein the polyester is polyethylene terephthalate.

10. A diskette, the recording disk of which is the magnetic recording medium defined in claim 1.

11. Magnetic recording medium as defined in claim 1 in the form of an elongated tape wound upon itself in roll form.

* * * * *